United States Patent
Fapojuwo

(10) Patent No.: US 6,330,232 B1
(45) Date of Patent: Dec. 11, 2001

(54) BASE STATION TRANSCEIVER SUBSYSTEM CARRIER SELECTION AT A CDMA CELL SITE

(75) Inventor: Abraham Olatunji Fapojuwo, Calgary (CA)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 08/895,200

(22) Filed: Jul. 16, 1997

(51) Int. Cl.[7] .................................................. H04B 7/216
(52) U.S. Cl. ............................................. 370/342; 370/441
(58) Field of Search ...................... 370/328, 329, 370/335, 342, 441, 462, 468, 348, 443; 455/524, 525, 522, 450, 452

(56) References Cited

U.S. PATENT DOCUMENTS

| | | | |
|---|---|---|---|
| 5,101,501 | * 3/1992 | Gilhousen et al. | 455/33 |
| 5,224,120 | 6/1993 | Schilling | 375/1 |
| 5,295,153 | 3/1994 | Gudmundson | 375/1 |
| 5,367,533 | 11/1994 | Schilling | 375/1 |
| 5,446,756 | 8/1995 | Mallinckrodt | 375/200 |
| 5,548,812 | 8/1996 | Padovani et al. | 455/33.2 |
| 5,574,984 | * 11/1996 | Reed et al. | 455/69 |
| 5,584,049 | 12/1996 | Weaver, Jr. et al. | 455/67.1 |
| 5,621,723 | * 4/1997 | Walton, Jr. et al. | 370/18 |
| 5,673,260 | * 9/1997 | Umeda et al. | 370/342 |
| 5,678,188 | * 10/1997 | Hisamura | 455/34.1 |
| 5,926,470 | * 7/1999 | Tiedemann | 370/334 |
| 5,940,762 | * 8/1999 | Lee et al. | 455/442 |
| 6,044,249 | * 3/2000 | Chandra et al. | 455/62 |
| 6,148,209 | * 11/2000 | Hamalainen et al. | 455/450 |

* cited by examiner

Primary Examiner—Dang Ton
Assistant Examiner—Toan Nguyen
(74) Attorney, Agent, or Firm—Dennis R. Haszko; Foley & Lardner

(57) ABSTRACT

An apparatus for selecting a CDMA base station transceiver subsystem from a plurality of base station transceiver subsystems to handle a call in a cellular telephone network, in response to a call request. The apparatus includes a receiver for receiving a representation of available call capacity from each of the base stations, a processor for examining the representation of available call capacity from each of the base stations to determine which of the base stations has the greatest available call capacity and a transmitter for transmitting to the base station with the greatest call capacity, an enabling message enabling the base station to handle the call.

13 Claims, 7 Drawing Sheets

CDMA CELLULAR ARCHITECTURE

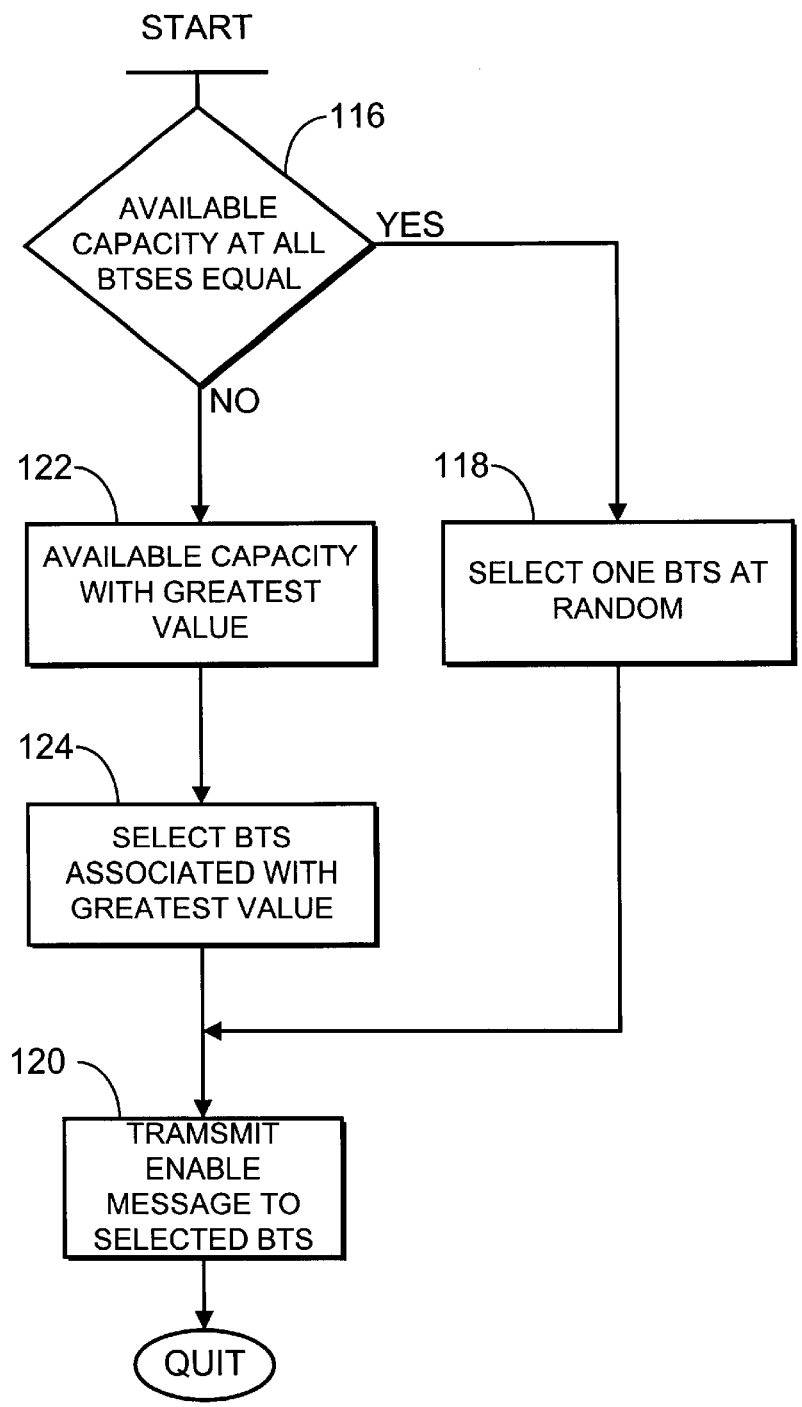

BASE STATION TRANSCEIVER SUBSYSTEM CARRIER SELECTION AT A CDMA CELL SITE

BACKGROUND OF THE INVENTION

This invention relates to the selection of Base Station Transceiver Subsystems (BTS) at a CDMA cell site provisioned with multiple co-located BTSs, each operating independently on a dedicated carrier.

Typically, in present CDMA cellular telephone systems, one CDMA base station transceiver subsystem (BTS) is used for each cell. This is sufficient for low to medium traffic demands; however, under heavy demands additional base station transceiver subsystems are required to provide an acceptable level of service.

In a cellular telephone network employing a plurality of base station transceiver subsystems (BTS), typically, the assignment of a particular BTS which is to handle a call, is made by a base station controller having a selector bank subsystem which runs a radio link manager program for determining which of the BTS systems is to be used for a particular call. Currently, the assignment of a call to a particular BTS is made on the basis of whether or not the excess forward link capacity of the BTS exceeds a pre-set LoCall Blocking Threshold and whether or not there are free traffic channel elements available. In areas where there is high traffic demand, one particular BTS may therefore be called upon to service more calls than another BTS, to the point where no further calls can be handled by the loaded BTS, while excess capacity is still available at the unloaded BTS. Various prior art references deal with issues such as handoff boundary balancing, adding and removing a BTS in a network, etc., however, none appears to deal with the problem of concentrated loads on a particular BTS within a multiple BTS cell site. The present invention addresses this problem.

BRIEF SUMMARY OF THE INVENTION

In accordance with one aspect of the invention there is provided a method of selecting a Code Division Multiple Access (CDMA) base station transceiver subsystem from a plurality of base station transceiver subsystems to handle a call in a cellular telephone network, in response to a call request. The method includes the steps of:
   a) receiving a representation of available call capacity from each of the base station transceiver subsystems;
   b) determining which of the base station transceiver subsystems has the greatest available call capacity; and
   c) enabling the base station transceiver subsystem having the greatest available call capacity to handle the call.

Preferably, the method includes the step of passing an available capacity request message from a selector bank subsystem to the base station transceiver subsystem subsystems.

Preferably, the method includes the step of storing in respective data storage elements representations of available call capacities of each of the base station transceiver subsystems.

Preferably, the method includes the step of transmitting to the base station transceiver subsystem having the greatest available call capacity, an enable message indicating that the selected base station transceiver subsystem is enabled to handle the call.

In accordance with another aspect of the invention, there is provided a method of estimating available call capacity at a CDMA base station transceiver subsystem. The method includes the steps of:
   a) determining available power to support additional calls by the base station transceiver subsystem;
   b) determining the average power used per channel;
   c) dividing a value representing the available power to support additional calls by a value representing the average power used per channel to determine the call capacity available;
   d) transmitting an available capacity response message including a representation of the call capacity available.

Preferably, the method includes the step of measuring the power consumed by each channel in use.

Preferably, the method includes the step of cumulatively adding values representing the power consumed by each channel in use to obtain a total forward transmit power usage value.

Preferably, the method includes the step of determining the number of channels in use.

Preferably, the method includes the step of dividing a value representing the total power usage by the number of channels in use to obtain the average power used per channel.

Preferably, the method includes the step of subtracting a value representing the total forward transmit power usage, a value representing a LoCall Blocking Threshold power and a value representing a pilot power of said base station transceiver from a value representing a maximum allowable total transmit power, to obtain a value representing the available power to support additional calls.

In accordance with another aspect of the invention, there is provided an apparatus for selecting a CDMA base station transceiver subsystem from a plurality of base station transceiver subsystems to handle a call in a cellular telephone network, in response to a call request. The apparatus includes a receiver for receiving a representation of available call capacity from each of the base stations, a processor for examining the representations of available call capacity from each of the base stations to determine which of the base stations has the greatest available call capacity and a transmitter for transmitting to the base station with the greatest call capacity, an enable message enabling the base station to handle the call.

Preferably, the transmitter is operable to pass an available capacity request message to at least two base station transceiver subsystems.

Preferably, the apparatus includes data storage elements for storing the representations of available call capacity.

In accordance with another aspect of the invention, there is provided an apparatus for estimating available call capacity at a CDMA base station transceiver subsystem having a plurality of traffic channel elements, a known maximum allowable total transmit power, a known pilot power and a known LoCall Blocking Threshold power. The apparatus includes a channel counter for counting the number of channels in use at any given time, a plurality of sensors for determining the power consumed by each channel in use, a processor for:
   a) subtracting a value representing the power consumed by all channels in use, a value representing the known LoCall Blocking Threshold power and a value representing the pilot power from a value representing the known maximum allowable total transmit power to determine the total transmit power available to support additional calls;
   b) dividing a value representing the power consumed by all channels in use by the number of channels in use to determine an average power used per channel; and c) dividing a value representing the total transmit power available to support additional calls by a value representing the average power used per channel to determine an available call capacity of the CDMA base station transceiver subsystem; and a transmitter for transmitting to a selector bank subsystem an available capacity response message including a representation of the available call capacity.

Preferably, the processor is operable to cumulatively add values representing the power consumed by each channel in use to obtain a total forward transmit power usage value.

In accordance with another aspect of the invention, there is provided a method of selecting a base station transceiver from a plurality of base station transceiver subsystems in a cellular telephone network. The method includes the steps of:

a) transmitting an available capacity request message from a selector bank subsystem to the base station transceiver subsystems;

b) receiving the available capacity request message at the base station transceiver subsystems;

c) at each base station transceiver subsystem:
  i) determining the available power to support additional calls by the base station transceiver subsystem;
  ii) determining the average power used per channel;
  iii) dividing a value representing the available power to support additional calls, by a value representing the average power used per channel to determine a call capacity available; and
  iv) transmitting an available capacity response message to the selector bank subsystem, the available capacity response message including a representation of the call capacity available;

d) receiving at the selector bank subsystem the available capacity response messages from each base station transceiver subsystem;

e) determining at the selector back subsystem which of the base stations has the greatest call capacity available; and f) transmitting an enabling message to a base station transceiver subsystem having the greatest call capacity available.

Preferably, the method includes the step of measuring the power consumed by each channel in use.

Preferably, the method includes the step of cumulatively adding values representing the power consumed by each channel in use to obtain a total forward transmit power usage value.

Preferably, the method includes the step of determining the number of channels in use.

Preferably, the method includes the step of dividing the total forward transmit power usage value by the number of channels in use to obtain the average power used per channel.

Preferably, the method includes the step of subtracting the total forward transmit power usage value, a value representing a LoCall Blocking Threshold power and a value representing a pilot power from a value representing the maximum allowable total transmit power to determine the available power to support additional calls.

In accordance with another aspect of the invention, there is provided a cellular telephone apparatus for conducting a cellular telephone call in response to a call request. The apparatus includes a selector bank subsystem, a plurality of base station transceiver subsystems in communication with the selector bank subsystem and operable to handle cellular telephone calls, a selector bank subsystem transmitter at the selector bank subsystem for transmitting an available capacity request message to each of the base station transceiver subsystems in response to the call request, a base station receiver at each base station transceiver subsystem for receiving the available capacity request message, a base station transceiver processor at each base station transceiver for:

a) determining the available power to support additional calls at the base station;

b) determining the average power used per channel;

c) dividing a value representing the available power to support additional calls by a value representing the average power used per channel to determine the call capacity available; and a base station transmitter at each of the base stations for transmitting to the selector bank subsystem an available capacity response message including a representation of the call capacity available, a selector bank subsystem receiver at the selector bank subsystem for receiving the available capacity response message from the base stations, and a selector bank subsystem processor at the selector bank subsystem for:

a) reading the available capacity response messages to determine which of the base stations has the greatest available call capacity; and b) for directing the selector bank subsystem transmitter to transmit an enabling message to the base station having the greatest available call capacity, such that the base station transceiver subsystem having the greatest available call capacity receives the enabling message and is rendered operative to handle the cellular telephone call.

Preferably, each of the base station transceiver subsystems includes a channel counter for counting the number of channels in use at any given time, a plurality of sensors for determining the power consumed by each channel in use and a processor for subtracting a value representing the power consumed by all channels in use, a value representing the known LoCall Blocking Threshold power and a value representing the pilot power from a value representing the known maximum allowable total transmit power to support additional calls, and for dividing a value representing the power consumed by all channels in use by the number of channels in use to produce an average power used per channel, and for dividing a value representing the available power to support additional calls by a value representing the average power used per channel to determine the call capacity available.

Preferably, the processor is operable to cumulatively add values representing the power consumed by each channel in use to obtain a total power usage value.

Essentially, a base station transceiver subsystem handles call originations and terminations at a code division multiple access (CDMA) cell site provisioned with multiple co-located BTSs, each operating independently on a dedicated CDMA carrier frequency. A BTS selection decision is made by a selector bank subsystem and is based on the available call capacity at the co-located BTSs. The invention addresses the problem of maintaining equal traffic loading at the BTSs in a CDMA cell site to prevent traffic overload at one BTS while other BTSs are underloaded. Deployment of co-located BTSs' addresses the problem of high capacity demand in "hot spot" areas.

BRIEF DESCRIPTION OF THE SEVERAL VIEWS OF THE DRAWING

In drawings which illustrate embodiments of the invention,

FIG. 7 is a flow chart depicting a BTS selection algorithm according to the first embodiment of the invention.

DETAILED DESCRIPTION OF THE INVENTION

FIG. 1

Figure 1:
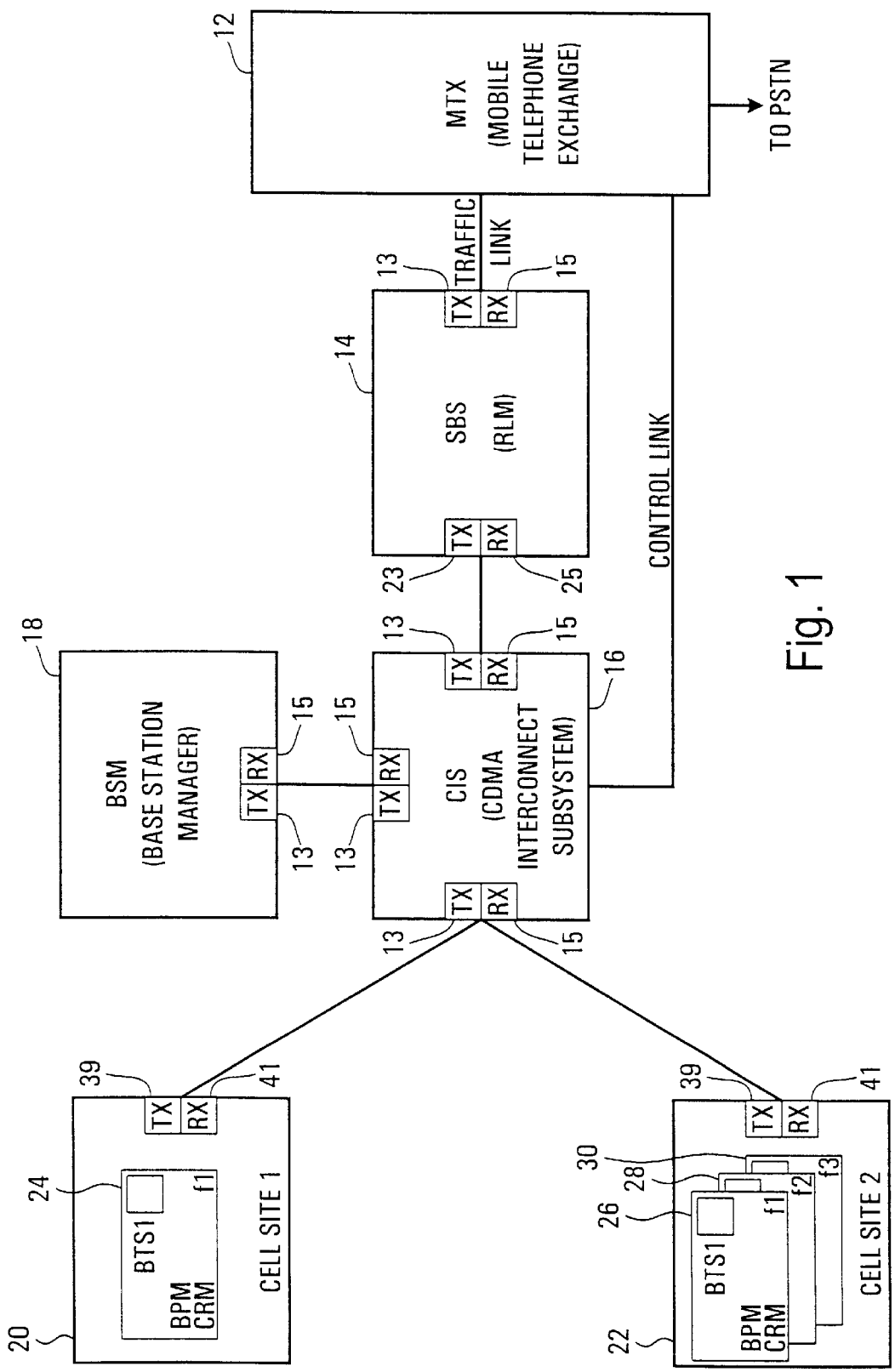
FIG. 1 is a block diagram depicting a code division multiple access (CDMA) cellular architecture according to a first embodiment of the invention.

Referring to FIG. 1, an apparatus according to a first embodiment of the invention is shown generally at 10. The apparatus includes a mobile telephone exchange 12, a selector bank subsystem (SBS) 14, a code division multiple access (CDMA) interconnect subsystem (CIS) 16, a base station manager (BSM) 18, and first and second cell sites 20 and 22, which are all part of a cellular telephone network. The first cell site has a single base station transceiver subsystem (BTS) 24, while the second cell site 22 has first, second and third base station transceiver subsystems 26, 28 and 30. Each base station transceiver subsystem serving the second cell site is operable to service at least three geographical sectors within the cell site and the sectors of one base station transceiver subsystem overlap corresponding sectors of the other base station transceiver subsystems serving the cell site. Thus, each geographical sector is serviced by three base station transceiver subsystems.

The mobile telephone exchange 12, the CDMA interconnect subsystem 16, and the base station manager 18 are implemented as separate hardware subsystems, each having at least one microprocessor and at least one set of message transmitters and receivers, 13 and 15 which provide communications capabilities for passing messages between each other.

FIG. 2

Figure 2:
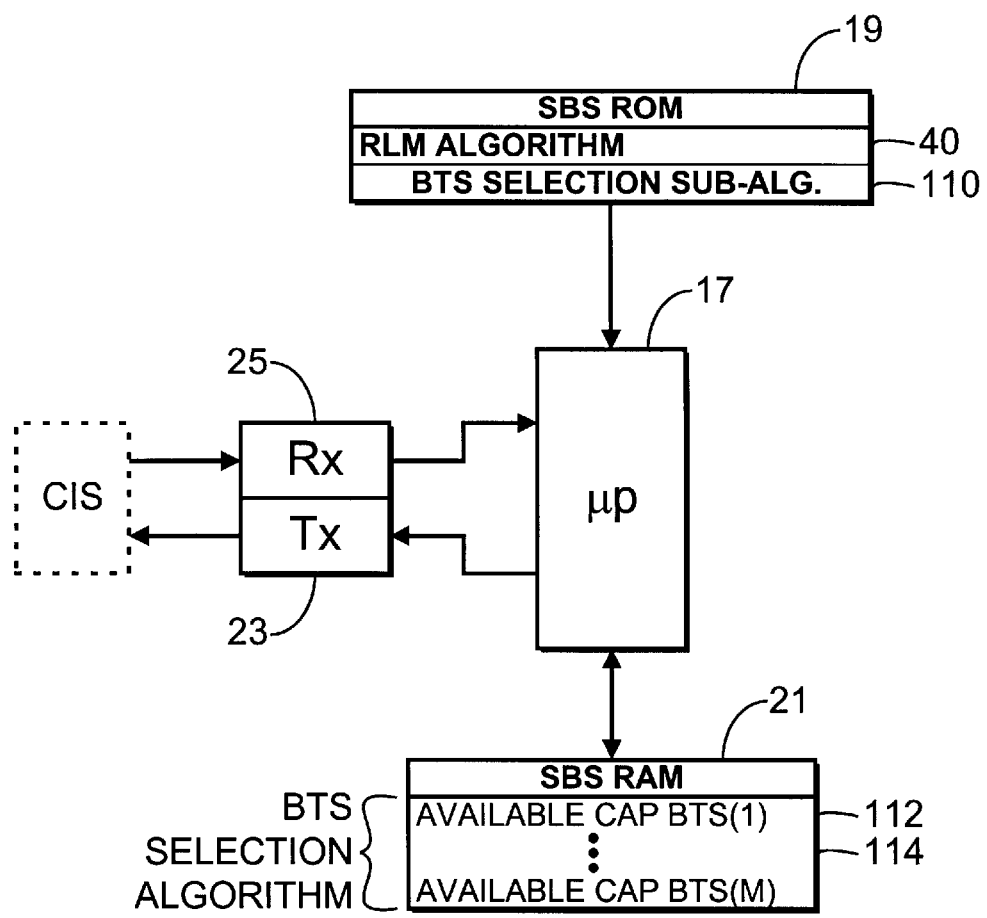
FIG. 2 is a schematic representation of a selector bank subsystem processor circuit, according to the first embodiment of the invention.

Referring to FIG. 2, the SBS 14 includes an SBS processor 17 in communication with an SBS Read Only Memory (ROM) 19, SBS Random Access Memory (RAM) 21 an SBS transmitter 23 and an SBS receiver 25. The SBS ROM includes blocks of instruction codes 40 operable to direct the SBS processor 17 to execute a radio link manager algorithm (RLM). The radio link manager algorithm is conventional with the exception that it includes a Base Station Transceiver Subsystem (BTS) selection sub-algorithm according to this embodiment of the invention. The BTS selection sub-algorithm is implemented by further blocks of codes 110, also stored in the SBS ROM 19.

The SBS RAM 21 is used to store variables used by the RLM algorithm and the BTS selection sub-algorithm 110 and has a plurality of registers, including one register for each BTS only two of which are shown at 112 and 114, for storing values representing available capacities of respective base station transceiver subsystems.

The transmitter and receiver 23 and 25 generally the same as transmitters and receivers 13 and 15 respectively and are in communication with the CIS 16 which is operable to pass messages from the SBS 14 to the base station transceiver subsystems and from the base station transceiver subsystems to the SBS 14, using conventional communications protocols.

FIG. 3

Figure 3:
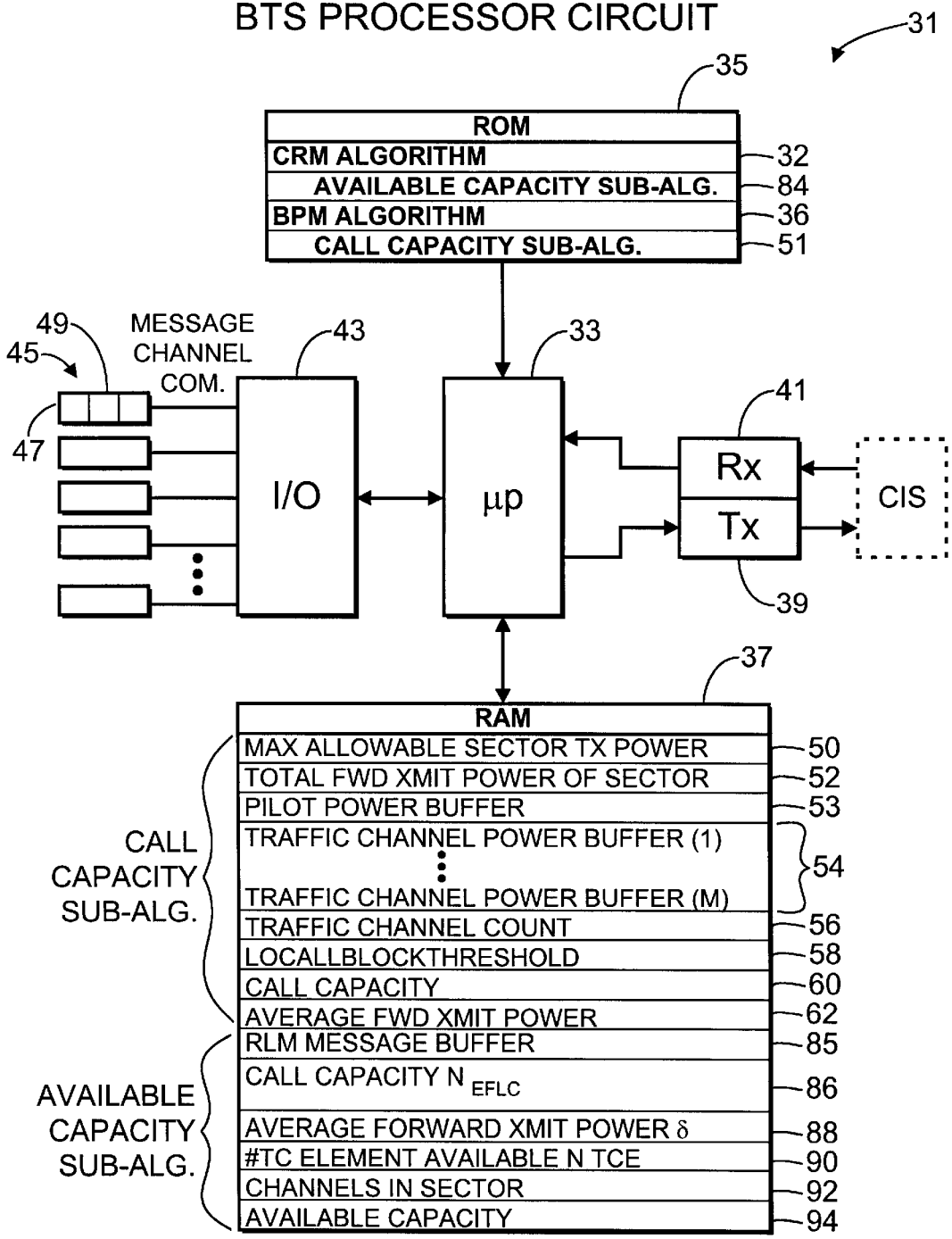
FIG. 3 is a schematic representation of a base station transceiver subsystem processor circuit, according to the first embodiment of the invention.

Referring to FIG. 3, each base station transceiver subsystem in a particular cell site, in this example cell site 2, has its own computer circuit 31 and includes a BTS processor 33 in communication with Read Only Memory (ROM) 35 and random access memory (RAM) 37. The computer circuit 31 further includes a transmitter and receiver 39 and 41, an I/O port 43, and a plurality of channel circuits 45, the channel circuits supporting respective communications channels for individual cellular telephone communication. Each channel circuit includes a respective sensor 47 for sensing the amount of power consumed by the channel circuits, while a telephone call is in progress. Thus, the sensors 47 are operable to measure the power consumed by each channel in use and each channel circuit includes a channel registration buffer 49 operable to store a "1" or "0" indicating whether or not a telephone call is in progress on the associated channel. Each channel circuit is operable to communicate with its associated BTS processor 33 through the I/O port 43 to pass information regarding the power consumed and whether or not the channel is active, to the BTS processor 33.

The BTS ROM 35 includes blocks of instruction codes 32 and 36 for directing the BTS processor to execute a call resource manager (CRM) algorithm, and a base station transceiver subsystem power manager (BPM) algorithm. The blocks of code implementing the CRM algorithm include block 84 which directs the processor to execute an available capacity sub-algorithm and the blocks of code implementing the BPM algorithm include a block 51 which directs the processor to execute a call capacity sub-algorithm.

BTS Buffers

Still referring to FIG. 3, the BTS RAM 37 includes a plurality of buffers for storing variables used in the call capacity sub-algorithm and the available capacity sub-algorithm.

Call Capacity Sub-algorithm Buffers

The buffers used by the call capacity sub-algorithm include a maximum allowable sector transmit power buffer 50, a total forward transmit power of sector buffer 52, a pilot power buffer 53, a plurality of traffic channel power buffers 54, including one buffer for each channel, a traffic channel count buffer 56, a low call blocking threshold buffer 58, a call capacity buffer 60 and an average forward transmit power buffer 62. Each of these buffers is associated with a single sector serviced by the BTS. Similar sets of buffers are associated with other sectors, respectively.

The contents of the maximum allowable sector transmit power buffer 50 are determined by an external routine (not shown) which directs the processor to determine the difference between the total power and the sector pilot power, and the difference between the total power and the minimum acceptable sector pilot sector power and to select, as the maximum allowable sector transmit power, the maximum difference value. This maximum difference value is stored in the maximum allowable sector transmit power buffer 50.

The pilot power buffer 53 is used to store a value representing the pilot power allotted to the sector serviced by the ETS. This value is pre-determined and is specified by an operator of the apparatus.

The total forward transmit power of sector buffer 52 is used to store a value representing the total of the power used by each channel to conduct communications.

The traffic channel power buffers 54 contain values indicative of the power used by each individual traffic channel handled by the BTS as determined by the sensors associated with the channel circuits 45.

The traffic channel count buffer 56 is used to store a value representing the total number of channels in use in the sector.

The low call blocking threshold buffer 58 is loaded with a pre-determined number indicating a low call blocking threshold value. Such number is pre-defined in configuration data loaded into memory at the time of system configuration. The low call blocking threshold is the minimum amount of excess forward link capacity power required before new calls are blocked.

The call capacity buffer 60 is used to store a value calculated by the call capacity algorithm, representing the call capacity of the sector.

The average forward transmit power buffer 62 is used to store a value calculated by the call capacity algorithm, representing the average forward transmit power of all channels within the sector.

Available Capacity Sub-algorithm Buffers

The available capacity sub-algorithm buffers include an RLM message buffer 85, a call capacity buffer 86, an average forward transmit power buffer 88, a number of traffic channel elements available buffer 90, a channels in sector buffer 92 and an available capacity buffer 94.

The RLM message buffer 85 is used to receive and store a message received from the SBS 14.

The call capacity buffer 86 is used to store a call capacity value calculated by the available capacity sub-algorithm.

The average forward transmit power buffer 88 is used to store an average forward transmit power value calculated by the available capacity sub-algorithm.

The number of traffic channel elements available buffer 90 is used to store the number of free traffic channel elements value calculated by the available capacity sub-algorithm.

The number of channels in sector buffer 92 is used to store a value representing the number of channels assigned to the sector. This value is pre-loaded into the RAM by an operator of the apparatus.

The available capacity buffer 94 is used to store a value representing the available capacity, in channels available for use in the sector. This value is determined by the available capacity algorithm.

Operation

When a user of a cellular telephone makes a request to place a call, a message is sent from a base station transceiver subsystem which receives the request, to the CIS 16. The CIS 16 communicates the request to the SBS 14.

FIG. 4

Figure 4:
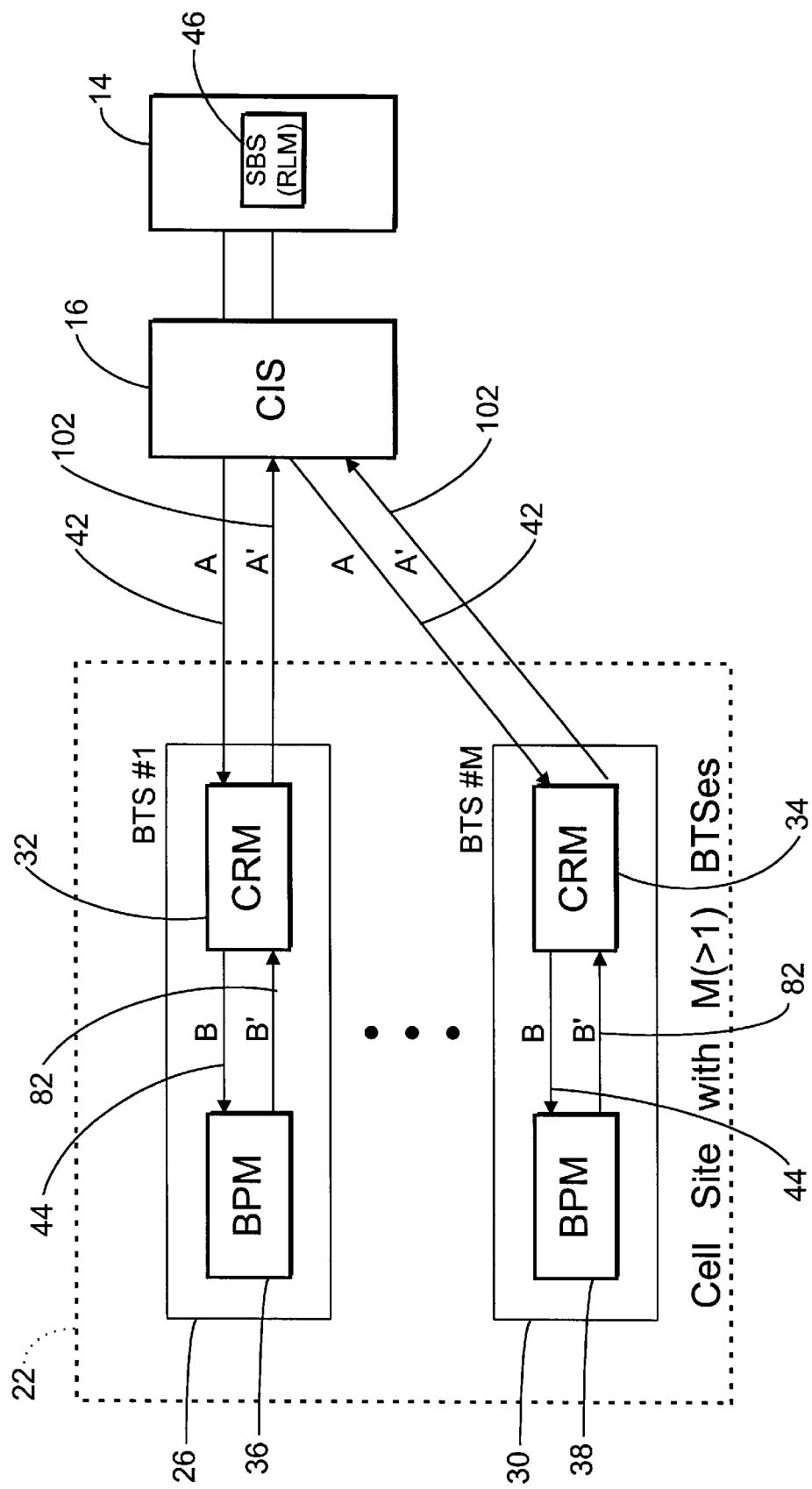
FIG. 4 is a block diagram depicting messaging between base station transceiver subsystems and a selector bank subsystem according to the first embodiment of the invention.

Referring to FIG. 4, the SBS 14 sends an available capacity request message 42 to the CIS 16 and the CIS 16 passes this message to each of the BTSs within the cell site 22 from which the call was made. Thus, an available capacity request message is passed from the selector bank subsystem to the base station transceiver subsystems.

Upon receipt of an available capacity request message 42 at a BTS, the call resource manager algorithm is invoked. The call resource manager algorithm directs the BTS processor to send a call capacity request message 44 to the BPM algorithm and directs the processor to invoke the BPM algorithm. Invocation of the BPM algorithm invokes the call capacity sub-algorithm.

Call Capacity Sub-Algorithm

Figure 5:
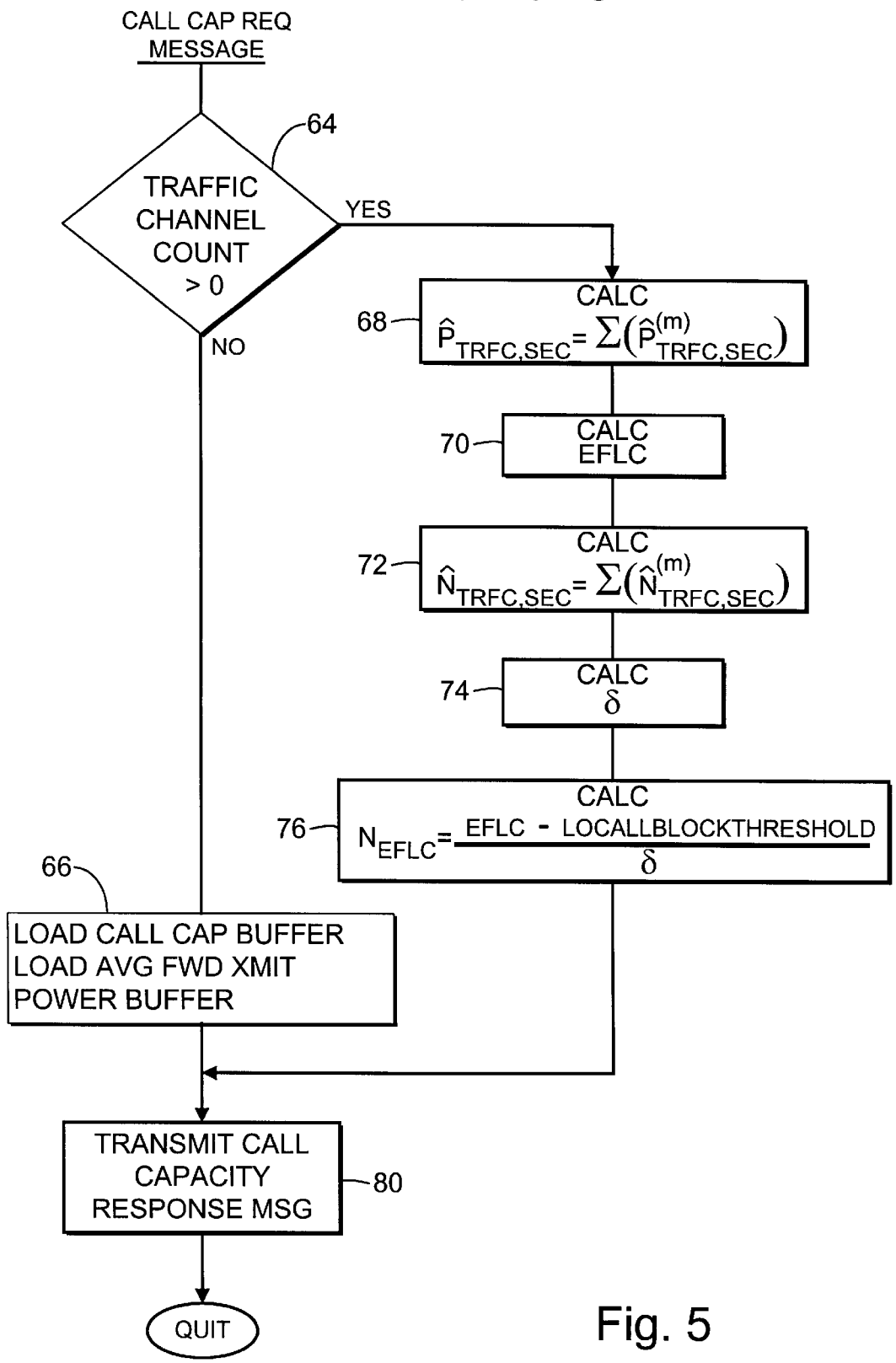
FIG. 5 is a flow chart describing a call capacity sub-algorithm according to the first embodiment of the invention.
Figure 6:
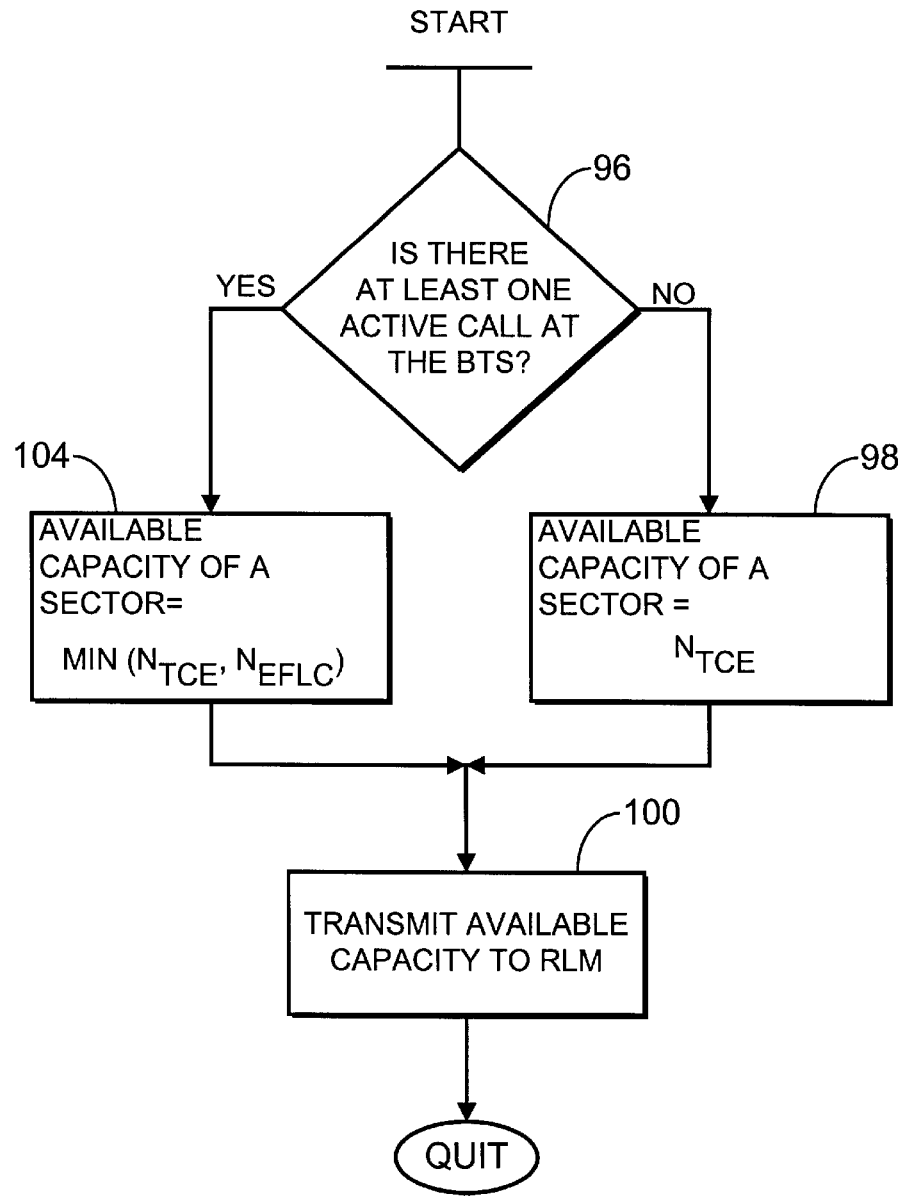
FIG. 6 is a flow chart describing an available capacity sub-algorithm according to the first embodiment of the invention.

Referring to FIGS. 5 and 6, the objective of the call capacity sub-algorithm is to calculate and store in the call capacity buffer 60 a sector call capacity value to make this value available to the available capacity sub-algorithm. In addition, the call capacity sub-algorithm calculates and stores in the average forward transmit power buffer 62 an average forward transmit power representing the average forward transmit power of all channels within the sector.

FIG. 5

Referring to FIGS. 3 and 5, the call capacity sub-algorithm begins with block 64 which directs the BTS processor to determine whether or not the contents of the traffic channel count buffer 56 are greater than 0. If not, then block 66 loads the call capacity buffer 60 with the contents of the number of channels in sector buffer 92 and loads the average forward transmit power buffer 62 with zero, to indicate that no power is currently being consumed.

If the contents of the traffic channel count buffer 56 are greater than zero, block 68 directs the processor to calculate and store in the total forward transmit power of sector buffer 52 the total forward transmit power of all the active traffic channels. This is calculated by accumulating the contents of the traffic channel power buffers 54. The total forward transmit power of active traffic channels is thus calculated according to the relation:

$$\hat{P}_{trfc,sec} = \sum_{m \in C} \hat{P}^{(m)}_{trfc,sec}$$

where $\hat{P}_{trfc,sec}^{(m)}$ is the power consumed by one active channel m is a channel index C is the set of all active channels in the sector In effect, the BTS processor is operable to cumulatively add the power consumed by each channel in use to obtain a total forward transmit power usage value for the sector.

Block 70 then directs the processor to calculate an Excess Forward Link Capacity (EFLC) of the sector by subtracting the contents of the total forward transmit power of sector buffer 52 and the contents of the pilot power buffer 53 from the contents of the maximum allowable sector transmit power buffer 50. Thus, the excess forward link capacity EFLC is calculated according to the following equation:

$$EFLC = \text{max allowable sector } TX \text{ power} - \hat{P}_{trfc,sec} - P_{pilot}$$

where $\hat{P}_{trfc,sec}$ is the total forward transmit power of active traffic channels $P_{pilot}$ is the pilot power The EFLC is stored in a temporary buffer (not shown) for use in later calculations.

Block 72 directs the processor to address each channel registration buffer 49 and accumulate in the traffic channel count buffer 56 the contents of each channel registration buffer to obtain a number representing the total number of active traffic channels in use. The total number of active traffic channels is calculated according to the equation:

$$N_{trfc,sec} = \sum_{m \in C} N_{trfc,sec}^{(m)}$$

where $N_{trfc,\,sec}{}^m$ is an indicator random variable which is equal to 1 if channel is active and 0 otherwise m is a channel index C is the set of all channels configured in sector.

The value stored in the traffic channel count buffer 56 thus indicates the number of traffic channels currently active within the sector.

Thus, block 72 acts as a traffic channel counter for counting the number of traffic channels in use at any given time.

Block 74 then directs the processor to store in the average forward transmit power buffer 62 an average forward transmit power value, calculated by dividing the total forward transmit power obtained at block 68 by the total number of active traffic channels indicated by the contents of the traffic channel count buffer 56. In other words, the average power is calculated according the relation:

$$\delta_{av} = \frac{\hat{P}_{trfc,sec}}{N_{trfc,sec}} = \frac{\text{total forward transmit power of all active traffic channels}}{\text{total number of active traffic channels}}$$

where $\delta_{av}$ is the average forward transmit power $\hat{P}_{trfc,\,sec}$ is the total forward transmit power of active channels, ie., the total power consumed by all channels in use $N_{trfc,\,sec}$ is the total number of active traffic channels, ie., the number of channels in use Effectively, block 74 directs the processor to divide the total forward transmit power usage value by the number of channels in use to produce an average power used per channel.

Block 76 then directs the processor to calculate and store in the call capacity buffer 60 a call capacity value by subtracting the contents of the LoCall Blocking Threshold buffer 58 from the EFLC value calculated at block 68 and dividing by the average forward transmit power calculated at block 74. Thus, the call capacity is calculated according to the relation:

$$n = \frac{(EFLC - LoCall\ Blocking\ Threshold)}{\delta_{av}}$$

The numerator of this equation effectively amounts to a subtraction of the LoCall Blocking Threshold power, the total forward transmit power used, (ie., the power consumed by all channels in use) and any pilot power, from the maximum allowable total transmit power and represents the total transmit power available to support additional calls by the base station, in the sector of concern, while the denominator represents the average power used for each channel. Thus, the processor divides the available power to support additional calls by the average power used per channel to determine the call capacity available.

Block 80 then directs the processor to make available to the CRM algorithm the call capacity value calculated in block 78. In effect, the call capacity value is passed to the CRM algorithm as a call capacity response message, as depicted schematically at 82 in FIG. 2.

Available Capacity Sub-Algorithm

FIG. 6

Referring to FIGS. 3 and 6, upon receipt of a call capacity response message at the CRM algorithm, the available capacity sub-algorithm, is executed. The available capacity sub-algorithm begins with block 96 which directs the BTS processor 33 to read the contents of the average forward transmit power buffer 88 to determine whether or not there is at least one call in progress. If no calls are in progress, the average forward transmit power will be zero, in which case block 96 directs the BTS processor 33 to continue at block 98 which directs the processor to determine the available capacity as the contents of the number of transmit channel elements available buffer 90. Thus, when no call is in progress in the sector, the available capacity is determined on the basis of the physical number of channels available. The available capacity calculated at block 98 is loaded into the available capacity buffer 94 and block 100 directs the BTS processor 33 to transmit the contents of the available capacity buffer 94 to the SBS 14 via the CIS 16, as an available capacity response message depicted schematically in FIG. 4 at 102. Thus, the BTS transmitter 39 transmits to the SBS 14 an available capacity response message 102 including a representation of the available call capacity. The available capacity sub-algorithm 84 is then ended.

Still referring to FIGS. 3 and 6, if, at block 96, the contents of the average forward transmit power buffer 88 are non-zero, it is assumed that at least one active call is in progress and therefore block 104 directs the processor to read the contents of the number of traffic channel elements available buffer 90 and the forward link capacity buffer 86 and determine which has the least value. The processor then copies the least value into the available capacity buffer 94. Thus, the available capacity when at least one active call is in progress, is calculated on the basis of the minimum of the call capacity based on excess forward link capacity, and, the number of traffic channel elements available. In other words, it is calculated on the basis of the available power and the physical resources available at the BTS.

Block 100 then transmits the contents of the available capacity buffer 94 to the radio link manager algorithm, in an available capacity response message ( 102 ) as described above.

It will be appreciated that each BTS responds to the original available capacity request message in the manner described above, with an available capacity response message including a representation of the call capacity available from the associated BTS servicing the sector. Thus, the SBS receiver 25 receives a representation of available call capacity from each of the base station transceiver subsystems and stores such representations in respective data storage elements.

Referring to FIG. 2, the SBS processor circuit executes a radio link manager algorithm (not shown) which has a BTS selection sub-algorithm. The BTS selection sub-algorithm selects the BTS having the greatest capacity as the one to handle the requested call. Referring to FIG. 2, the BTS selection algorithm is executed after all available capacity response messages are received from each BTS servicing the sector. The respective available capacities of each BTS are stored in respective available capacity buffers 112 and 114, etc. The available capacity buffers 112 and 114, etc. thus contain values representing the available capacities of respective base station transceiver subsystems, as determined from available capacity response messages received from each BTS.

BTS Selection Algorithm
FIG. 7

Referring to FIGS. 2 and 7, the BTS selection sub-algorithm 110 begins with block 116 which directs the SBS processor 17 to retrieve the contents of the available capacity buffers 112, 114, etc., and determine whether or not the values contained therein are equal. If so, then block 118 directs the SBS processor 17 to select one BTS, at random, and block 120 directs the SBS processor 17 to transmit an enable message to such selected BTS to enable it to handle the call requested. The BTS which receives the enabling message is rendered operative to handle the cellular telephone call.

If at block 116, the contents of the available capacity buffers 112 and 114 are not equal, block 122 directs the SBS processor 17 to determine which of the available capacity buffers 112 and 114 has the greatest contents. Thus, the SBS processor 17 is directed to examine the representations of available call capacity from each of the base stations to determine which of the base station transceiver subsystems has the greatest available call capacity.

The SBS processor 17 is then directed to block 124 which selects the BTS associated with the buffer having the greatest value.

Block 120 then directs the SBS processor 17 to operate the transmitter 23 to transmit an enable message to the selected BTS to enable it to handle the requested call. In effect, therefore, the SBS processor 17 in the SBS is directed to direct the SBS transmitter to transmit an enable message to the base station having the greatest available call capacity. The BTS which receives the enable message is rendered operative to handle the cellular telephone call. Thus, the base station transceiver subsystem having the greatest available call capacity is enabled to handle the call.

It will be appreciated that the available capacity of each BTS is used in determining which is to be used to handle a call. By selecting the BTS with the greatest available call capacity, traffic loading within a cell can be evenly distributed. This prevents traffic overload at one BTS and underloading at others.

It will be appreciated that the foregoing description relates to a CDMA system in which a selection is made between a plurality of BTSs for handling a call. The invention may, however, be used in connection with the selection of (radio frequency) RF carriers in a frequency division multiplexed system or time slots in a time division multiplexed system.

While specific embodiments of the invention have been described and illustrated, such embodiments should be considered illustrative of the invention only and not as limiting the invention as construed in accordance with the accompanying claims.

What is claimed is:

1. A method of estimating available call capacity at a Code Division Multiple Access (CDMA) base station transceiver subsystem, the method comprising the steps of:
   a) determining available power to support additional calls by said base station transceiver subsystem;
   b) determining the average power used per channel;
   c) dividing a value representing the available power to support additional calls by a value representing the average power used per channel to determine the call capacity available;
   d) measuring the power consumed by each channel in use;
   e) cumulatively adding values representing the power consumed by each channel in use to obtain a total forward transmit power usage value;
   f) determining the number of channels in use;
   g) dividing a value representing the total power usage by the number of channels in use to obtain the average power used per channel; and
   h) subtracting a value representing the total forward transmit power usage, a value representing a LoCall Blocking Threshold power and a value representing a pilot power of said base station transceiver subsystem from a value representing a maximum allowable total transmit power, to obtain a value representing the available power to support additional calls.

2. An apparatus for estimating available call capacity at a Code Division Multiple Access (CDMA) base station transceiver subsystem having a plurality of traffic channel elements, a known maximum allowable total transmit power, a known pilot power and a known LoCall Blocking Threshold power, the apparatus comprising:
   a) a channel counter for counting the number of channels in use at any given time;
   b) a plurality of sensors for determining the power consumed by each channel in use;
   c) a processor for:
      i) subtracting a value representing the power consumed by all channels in use, a value representing the known LoCall Blocking Threshold power and a value representing the pilot power from a value representing the known maximum allowable total transmit power to determine the total transmit power available to support additional calls;
      ii) dividing a value representing the power consumed by all channels in use by the number of channels in use to determine an average power used per channel; and
      iii) dividing a value representing the total transmit power available to support additional calls by a value representing the average power used per channel to determine an available call capacity of the CDMA base station transceiver subsystem; and
   d) a transmitter for transmitting to a selector bank subsystem an available capacity response message including a representation of said available call capacity.

3. An apparatus as claimed in claim 2 wherein said processor is operable to cumulatively add values representing the power consumed by each channel in use to obtain a total forward transmit power usage value.

4. A method of selecting a base station transceiver subsystem from a plurality of base station transceiver subsystems in a cellular telephone network, the method comprising the steps of:
   a) transmitting an available capacity request message from a selector bank subsystem to said base station transceiver subsystems;
   b) receiving said available capacity request message at said base station transceiver subsystems;
   c) at each base station transceiver subsystem:
      i) determining the available power to support additional calls by the base station transceiver subsystem;
      ii) determining the average power used per channel;
      iii) dividing a value representing the available power to support additional calls, by a value representing the average power used per channel to determine a call capacity available; and
      iv) transmitting an available capacity response message to the selector bank subsystem, the available capacity response message including a representation of the call capacity available;

d) receiving at said selector bank subsystem said available capacity response messages from each base station transceiver subsystem;

e) determining at said selector bank subsystem which of said base station transceiver subsystems has the greatest call capacity available; and f) transmitting an enabling message to a base station transceiver subsystem having the greatest call capacity available.

5. A method as claimed in claim 4 further including the step of measuring the power consumed by each channel in use.

6. A method as claimed in claim 5 further including the step of cumulatively adding values representing the power consumed by each channel in use to obtain a total forward transmit power usage value.

7. A method as claimed in claim 6 further including the step of determining the number of channels in use.

8. A method as claimed in claim 7 further including the step of dividing the total forward transmit power usage value by the number of channels in use to obtain said average power used per channel.

9. A method as claimed in claim 8 further including the step of subtracting the total forward transmit power usage value, a value representing a LoCall Blocking Threshold power and a value representing a pilot power from a value representing the maximum allowable total transmit power to determine the available power to support additional calls.

10. A cellular telephone apparatus for conducting a cellular telephone call in response to a call request, the apparatus comprising:

a) a selector bank subsystem;

b) a plurality of base station transceiver subsystems in communication with said selector bank subsystem and operable to handle cellular telephone calls;

c) a selector bank subsystem transmitter at said selector bank subsystem for transmitting an available capacity request message to each of said base station transceiver subsystems, in response to said call request;

d) a base station receiver at each base station transceiver subsystem for receiving said available capacity request message;

e) a base station processor at each base station transceiver subsystem for:
  i) determining the available power to support additional calls at the base station;
  ii) determining the average power used per channel;
  iii) dividing a value representing the available power to support additional calls by a value representing the average power used per channel to determine the call capacity available; and f) a base station transmitter at each of said base stations for transmitting to said selector bank subsystem an available capacity response message including a representation of said call capacity available;

g) a selector bank subsystem receiver at said selector bank subsystem for receiving said available capacity response message from said base stations; and h) a selector bank subsystem processor at said selector bank subsystem for:
  i) reading said available capacity response messages to determine which of said base stations has the greatest available call capacity; and
  ii) for directing said selector bank subsystem transmitter to transmit an enabling message to said base station having the greatest available call capacity, such that said base station transceiver subsystem having the greatest available call capacity receives said enabling message and is rendered operative to handle said cellular telephone call.

11. An apparatus as claimed in claim 10 wherein each of said base station transceiver subsystems includes:

a) a channel counter for counting the number of channels in use at any given time;

b) a plurality of sensors for determining the power consumed by each channel in use; and c) a processor for:
  i) subtracting a value representing the power consumed by all channels in use, a value representing said known LoCall Blocking Threshold power and a value representing a pilot power, from a value representing said known maximum allowable total transmit power to support additional calls;
  ii) dividing a value representing the power consumed by all channels in use by the number of channels in use to determine an average power used per channel; and
  iii) dividing a value representing the available power to support additional calls by a value representing the average power used per channel to determine the call capacity available.

12. An apparatus as claimed in claim 11 wherein said sensor is operable to measure the power consumed by each channel in use.

13. An apparatus as claimed in claim 12 wherein said processor is operable to cumulatively add values representing the power consumed by each channel in use to obtain a total power usage value.

* * * * *